(12) United States Patent
Itoh

(10) Patent No.: US 10,540,086 B2
(45) Date of Patent: Jan. 21, 2020

(54) APPARATUS, METHOD AND COMPUTER PROGRAM PRODUCT FOR INFORMATION PROCESSING AND INPUT DETERMINATION

(71) Applicant: LENOVO (Singapore) PTE. LTD., New Tech Park (SG)

(72) Inventor: Hiroshi Itoh, Sagamihara (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 207 days.

(21) Appl. No.: 15/376,370

(22) Filed: Dec. 12, 2016

(65) Prior Publication Data

US 2017/0168674 A1 Jun. 15, 2017

(30) Foreign Application Priority Data

Dec. 11, 2015 (JP) .................................. 2015-242236

(51) Int. Cl.
*G06F 3/0488* (2013.01)
*G06F 3/0484* (2013.01)

(52) U.S. Cl.
CPC .......... *G06F 3/0488* (2013.01); *G06F 3/0484* (2013.01); *G06F 3/04883* (2013.01); *G06F 3/04886* (2013.01); *G06F 2203/04808* (2013.01); *G06F 2203/04809* (2013.01)

(58) Field of Classification Search
CPC ......... G06F 2203/04808; G06F 3/0484; G06F 3/0488; G06F 3/04886; G06F 2203/04809; G06F 3/04883
See application file for complete search history.

(56) References Cited

U.S. PATENT DOCUMENTS

| 9,041,652 | B2 * | 5/2015 | Elias | ....................... G06F 3/044 341/22 |
| 9,454,239 | B2 * | 9/2016 | Elias | ..................... G06F 3/0213 |
| 10,048,862 | B2 * | 8/2018 | Stewart | ............... G06F 3/04886 |
| 2009/0091540 | A1 * | 4/2009 | Doan | ................. G01C 21/3664 345/173 |

(Continued)

FOREIGN PATENT DOCUMENTS

| JP | 08249099 A | 9/1996 |
| JP | 2010176299 A | 8/2010 |

(Continued)

*Primary Examiner* — Chau T Nguyen
(74) *Attorney, Agent, or Firm* — Kunzler Bean & Adamson

(57) ABSTRACT

An apparatus, method and computer program product are disclosed. The apparatus includes: an operation timing detection unit to detect when an input operation is made; a typing determination unit to determine whether the touch operation is a character input operation; and a key input process unit to perform a character input process if the touch operation is a character input operation. The method includes detecting a timing when an input operation is made, determining whether the touch operation is a character input operation, and performing a character input process if the touch operation is a character input operation. The computer program product includes code to detect a timing when a touch operation is made, determine whether the touch operation is a character input operation, and perform a character input process if the touch operation is a character input operation.

20 Claims, 11 Drawing Sheets

(56) References Cited

U.S. PATENT DOCUMENTS

| | | | | |
|---|---|---|---|---|
| 2010/0066695 A1* | 3/2010 | Miyazaki | ............ | G06F 3/04886 345/173 |
| 2011/0302519 A1* | 12/2011 | Fleizach | ............. | G06F 3/03547 715/773 |
| 2013/0106700 A1* | 5/2013 | Sugiura | ............... | G06F 3/04886 345/168 |
| 2013/0241837 A1* | 9/2013 | Oga | .................... | G06F 3/04886 345/168 |
| 2016/0070465 A1* | 3/2016 | Stewart | ............... | G06F 3/04886 715/773 |

FOREIGN PATENT DOCUMENTS

| | | |
|---|---|---|
| JP | 2013098826 A | 5/2013 |
| JP | 2014052864 A | 3/2014 |
| JP | 2014059722 A | 4/2014 |
| JP | 2014176019 A | 9/2014 |
| JP | 2015011610 A | 1/2016 |
| JP | 2016045834 A | 4/2016 |
| WO | 2012/061569 A2 | 5/2012 |
| WO | 2013/118226 A1 | 8/2013 |

* cited by examiner

APPARATUS, METHOD AND COMPUTER PROGRAM PRODUCT FOR INFORMATION PROCESSING AND INPUT DETERMINATION

CROSS-REFERENCE TO RELATED APPLICATIONS

Foreign: This patent application claims priority to Japan Patent Application No. 2015-242236 filed on 11 Dec. 2015 for Hiroshi Itoh, the entire contents of which are incorporated herein by reference for all purposes.

FIELD

The subject matter disclosed herein relates to an information processing device, an input determination method and computer program product.

BACKGROUND

Portable computing devices such as tablet personal computers (hereinafter referred to as "tablet PCs), smartphones, personal digital assistances (PDAs), and electronic book readers are becoming more ubiquitous. Many portable information devices use a touch panel together with a display device. Such devices often use software keyboards, also known as on-screen keyboards (OSKs) or screen keyboards, to obtain input from the user through the touch panel.

However, unlike physical keyboards, wherein the key must be physically depressed to trigger a key input, software keyboards appear on a flat display and a key input can be performed by mere contact of a finger with a touch panel without the movement of a physical key. Thus, if a finger remains on the software keyboard, it is difficult for a portable information device to determine whether the presence of the finger is intended to be a key input or not.

BRIEF SUMMARY

An apparatus, method and computer program product for information processing and input determination are disclosed.

The apparatus includes: an operation timing detection unit to detect a time when an operation medium is placed on a character key region of a software keyboard; a typing determination unit that determines that placement of the operation medium on a character key at the operation timing is a character input operation if, using the operation timing as a reference operation timing, an operation timing at an interval no greater than a predetermined time from the reference operation timing is not detected; and a key input process unit to perform a character input process if the placement of the operation medium is determined to be the character input operation.

The method includes: detecting, as an operation timing, a timing when an operation medium is placed on a character key region of a software keyboard of an information processing device; determining that placement of the operation medium on a character key at the operation timing is a character input operation if, using the operation timing as a reference operation timing, another operation timing is not detected within an interval no greater than a predetermined time from the reference operation timing; and performing a character input process depending on a function of the character key on which the operation medium is placed at the operation timing after the placement is determined to be the character input operation.

The computer program product includes code to perform: detection, as an operation timing, of a timing when an operation medium is placed on a character key region for receiving character input in a software keyboard; a determination that a placement of the operation medium on a character key at the operation timing is a character input operation if, using the operation timing as a reference operation timing, another operation timing is not detected within an interval no greater than a predetermined time from the reference operation timing; and performance of a character input process depending on a function of the character key on which the operation medium is placed at the operation timing when the placement is determined to be the character input operation by the typing determination unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
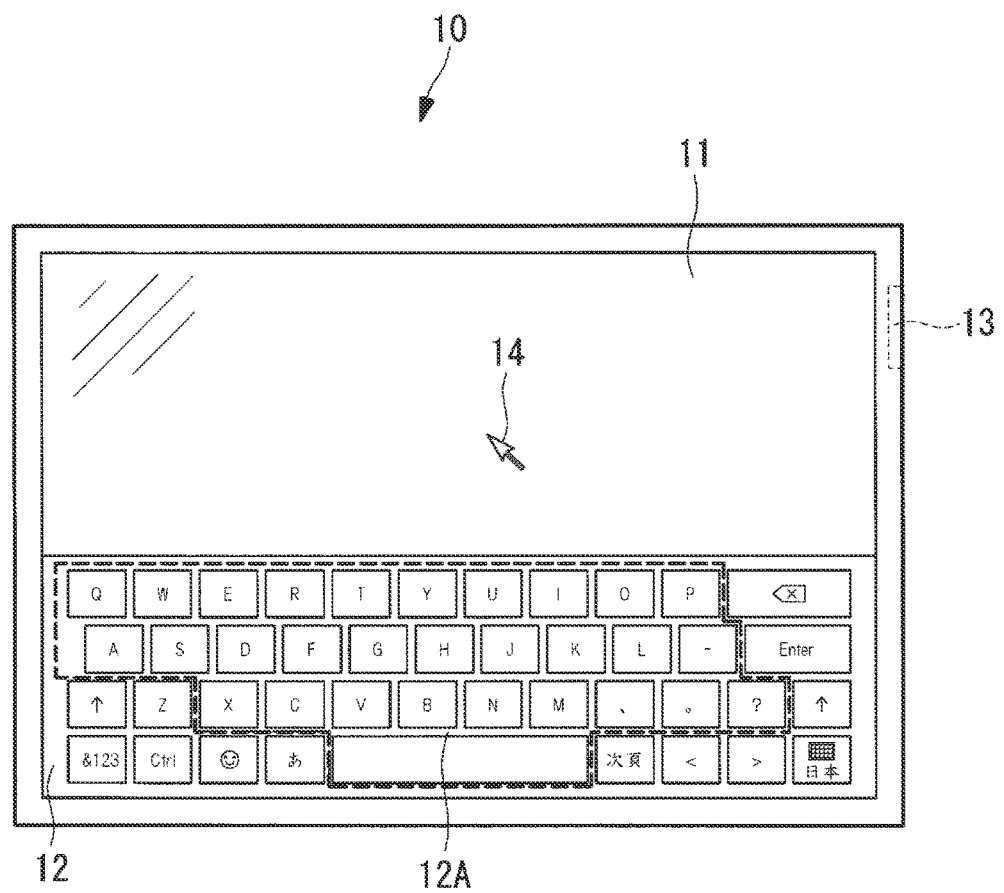
FIG. 1 is a schematic illustration of one embodiment of a portable information device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Information processing devices, input determination methods, and programs according to various embodiments will be described with reference to the drawings. In the embodiments, the information processing devices are portable information devices.

FIG. 1 is an outline view schematically illustrating a portable information device 10 according to this embodiment. The portable information device 10 of this embodiment comprises a tablet PC having no physical keyboard. The portable information device 10 includes an image display section serving as a touch panel 11.

A user of the portable information device 10 operates the portable information device 10 through the touch panel 11. For example, in order for the user to input a character, a software keyboard, hereinafter referred to as an "on-screen keyboard" or "OSK" 12 for receiving the character input is displayed on the touch panel 11 so that the user can carry out input of a character, number, and/or symbol (hereinafter simply referred to as a "character") through the software keyboard 12. The OSK 12 includes a plurality of character keys for receiving character input and a plurality of function keys having functions other than character input. The character keys constitute a region of character keys (e.g., a region enclosed by broken lines in FIG. 1 and hereinafter referred to as a "character key region") 12A, and the function keys constitute a region of function keys.

The character key region 12A includes not only the regions of images representing character keys but also the regions between character keys. The function keys include known keys such as a shift key "Shift," function key "Fn," control key "Ctrl," alternate key "Alt," delete key "Delete," backspace key "Backspace," enter key "Enter," keys for input characters "& 123", a symbol key, and a key for input switching between uppercase and lowercase. The function keys also include various types of keys including keys not shown in the drawing attached to this application and keys that can be employed depending on the type of the portable information device 10 and the type of application software executed by the portable information device 10. In this embodiment, a space key is regarded as a character key.

Operation, such as character input, to the OSK 12 are received when an operation medium is placed on a key of the OSK 12. The operation medium can be a finger of a human, a pen, or other media. In this embodiment, the operation medium comprises a finger of a human. An action in which the finger is placed on the OSK 12 will be hereinafter referred to as "contact."

The portable information device 10 includes a universal serial bus (USB) port 13 as an external output terminal on a side surface, for example. The USB port 13 is used for connecting another device to the portable information device 10. For example, a mouse can be connected to the USB port 13. With this mouse, the portable information device 10 moves a pointer 14 (or cursor) displayed on the touch panel 11, and performs a process in accordance with a single-click or a double-click on the mouse.

Figure 2:
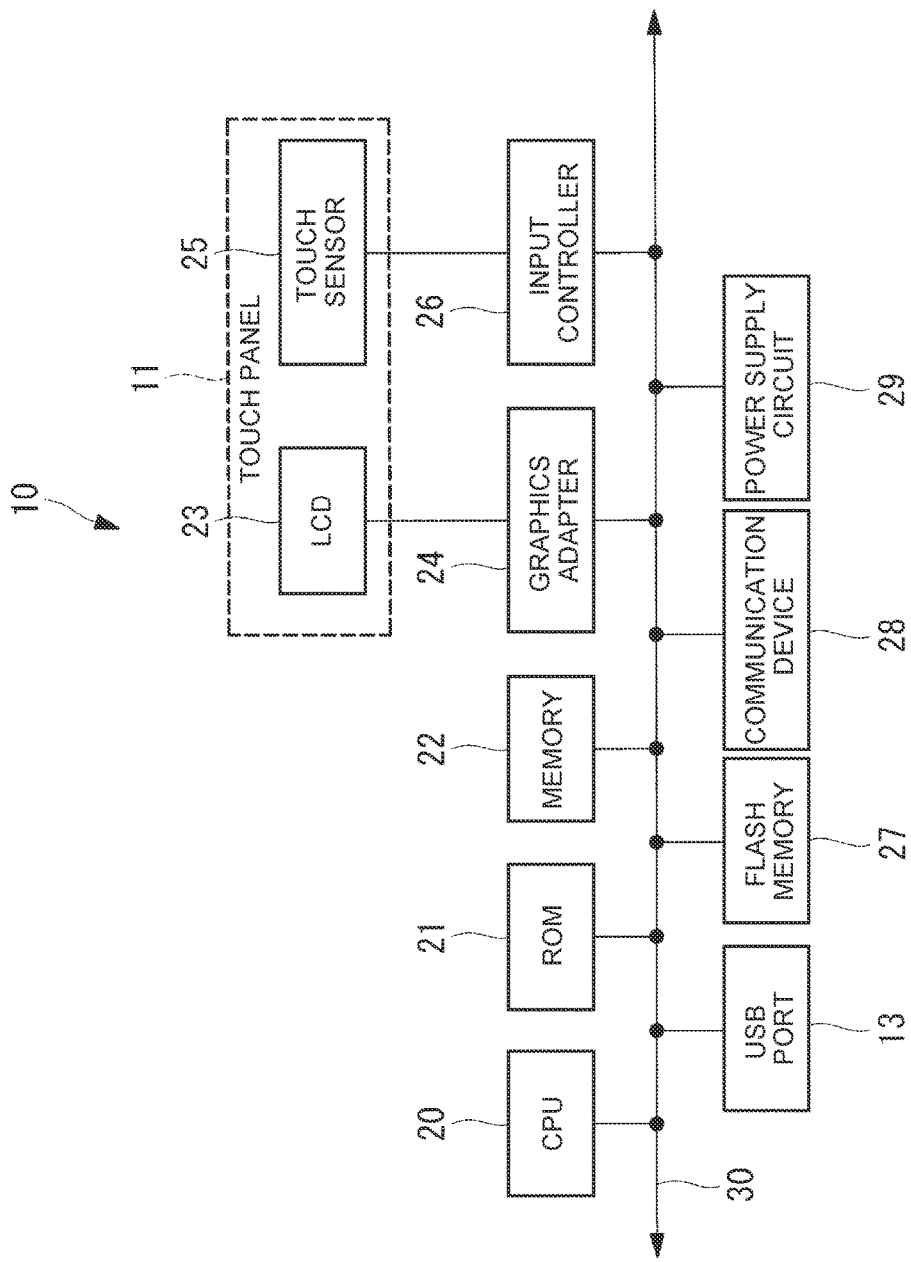
FIG. 2 is a schematic illustration of one embodiment of a hardware configuration of a portable information device.

FIG. 2 is a schematic illustration of one embodiment of a hardware configuration of the portable information device 10.

The portable information device 10 includes a central processing unit (CPU) 20, a read only memory (ROM) 21, a memory 22, a liquid crystal display (LCD) 23, a graphics adapter 24, a touch sensor 25, an input controller 26, a flash memory 27, a communication device 28, a power supply circuit 29, and the USB port 13. These components are connected directly or indirectly through a bus 30. The touch panel 11 includes the LCD 23 and a touch sensor 25.

The CPU 20 controls the entire portable information device 10 using an operating system (OS) stored in the flash memory 27 connected to the CPU 20 through the bus 30, and performs processing based on programs stored in the flash memory 27.

The ROM 21 stores a basic input/output system (BIOS) and various types of data.

The memory 22 comprises a cache memory or a random-access memory (RAM), and is a programmable memory that is used as a work area for reading of a program to be executed by the CPU 20 or writing of data to be processed by the program.

The LCD 23 displays a video signal from the graphics adapter 24 as an image in accordance with control of the CPU 20. In accordance with the control of the CPU 20, the graphics adapter 24 converts display information to a video signal, and outputs the obtained video signal to the LCD 23.

The touch sensor 25, in some embodiments, comprises a capacitance-type touch sensor that detects a user's touch position on the LCD 23, and outputs the detected touch position to the input controller 26. The touch sensor 25 is used for selecting screen objects, such as menus, icons, buttons, and keys of a keyboard displayed on the screen of the LCD 23 to perform input operations. The touch sensor 25 is also used for performing an input operation of a text or a screen operation such as scrolling or swiping. The touch panel 11 comprises both the LCD 23 and the touch sensor 25.

The input controller 26 causes a processor to execute programs that are stored, for example, in the ROM 21, and controls the operation of the touch sensor 25.

The flash memory 27 has the function of storing, as examples, an OS for controlling the entire portable information device 10, such as Windows®, iOS®, Android®. The flash memory 27 may also store drivers for hardware operations of peripheral devices, applications for specific jobs, various types of data, and files. The portable information device 10 may have another storage device such as a hard disk drive (HDD) instead of the flash memory 27.

The communication device 28 controls communication with other devices through a network.

In some embodiments, the power supply circuit 29 comprises an AC adapter, an intelligent battery, a charger for charging the intelligent battery, and a DC-to-DC converter, and supplies electric power to the devices in accordance with control of the CPU 20.

Figure 3:
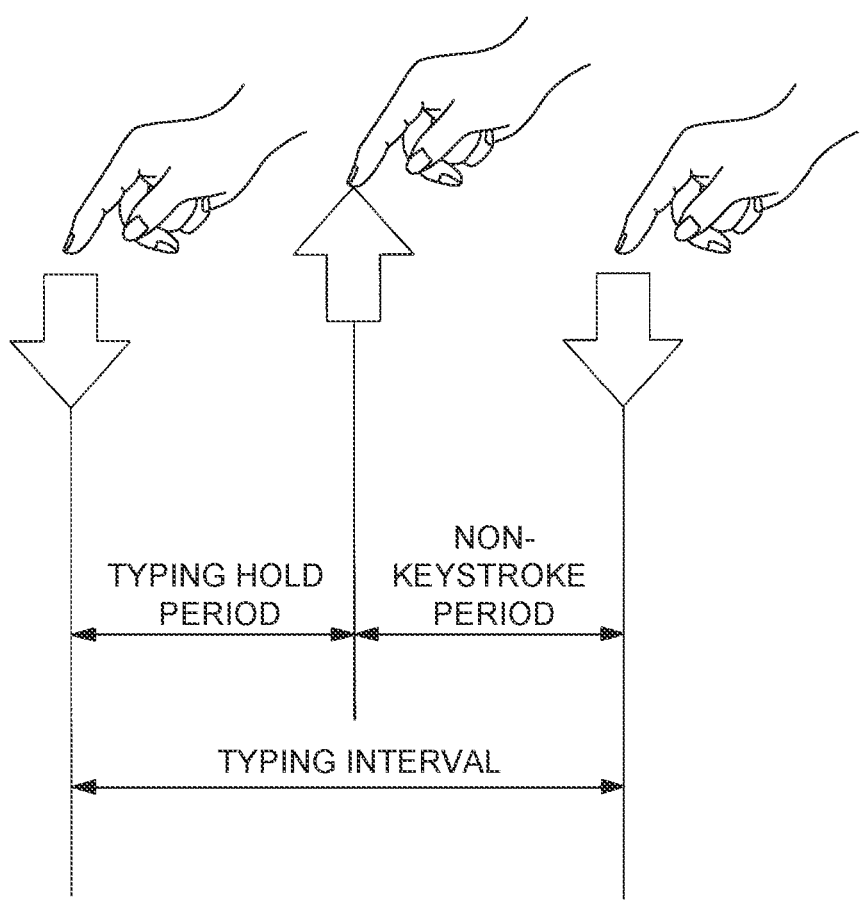
FIG. 3 is a schematic illustration of an overview of typing as performed on one embodiment of a portable information device.

FIG. 3 schematically illustrates an overview of typing (character input operation) on the OSK 12 or a hardware keyboard.

During a typing operation, a user presses a key, and thereafter releases the key before pressing the next key. The tip of the finger remains in contact with the key throughout a period of time that begins when a key is first pressed with a finger and ends when the finger leaves the key. This period will be hereinafter referred to as a typing hold period. After releasing the key, a period during which the finger is not in contact with a key and in which no keys are pressed continues until a next key is pressed. This period will be hereinafter referred to as a non-keystroke period. A period measured from the beginning of a typing hold period to the end of the following non-keystroke period will be hereinafter referred to as a typing interval.

A minimum value of a typing interval in a hardware keyboard (that is, a typing interval of a user with a maximum typing speed) is defined as a minimum typing interval. This minimum typing interval can be obtained by actual measurement, but is generally in the range of several tens of milliseconds (msec.).

One of differences between the OSK 12 and the hardware keyboard is the absence of a key stroke, or physical movement of the key, in the OSK 12. That is, the OSK 12 does not need pressing of a key for key input, unlike a hardware keyboard. Thus, when a finger remains on the character key region 12A of the OSK 12, it is difficult for the portable information device 10 to determine whether the placement of the finger is a key input, such as typing (character input operation), or not.

The state in which a finger is placed on the character key region 12A of the OSK 12 but the finger is not carrying out a typing operation will be referred to as a typing stop state. In the typing stop state, contact of the finger with the touch panel 11 is maintained.

One aspect of the typing stop state is finger rest. When using a hardware keyboard, the finger rest is a state in which a finger is placed on a key without pressing it. In the case of the OSK 12, which requires very small or no keystrokes, however, it is difficult to determine the difference between a typing operation and a finger rest as described above. In the typing stop state, a character input operation is temporarily invalidated so as not to perform character input. That is, in the typing stop state, a character input process described later is not performed. To help solve this problem, the portable information device 10 according to this embodiment has a typing determination function described later.

Figure 4:
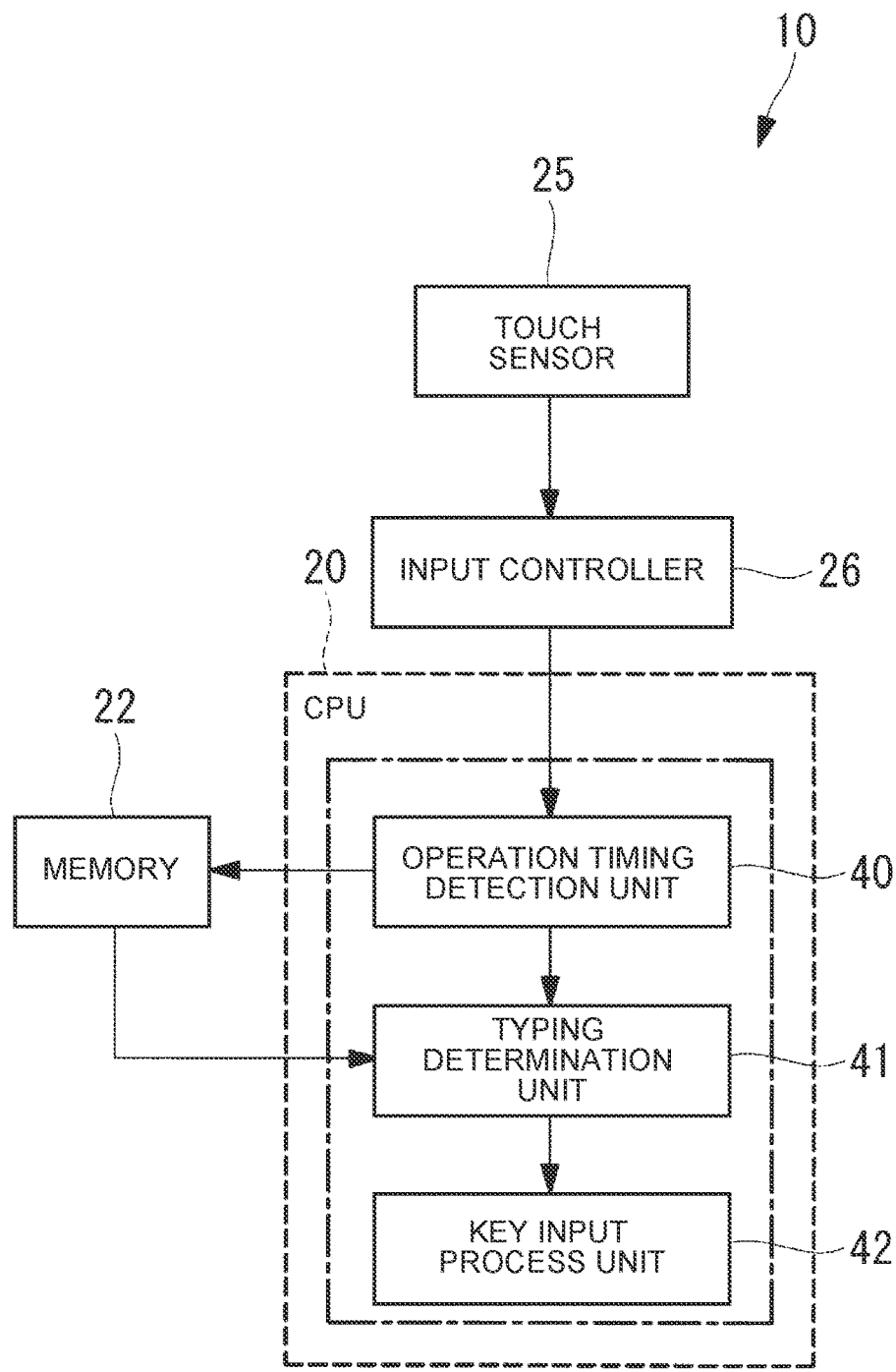
FIG. 4 is a functional block diagram of a typing determination function according to one embodiment of the current subject matter.

FIG. 4 is a functional block diagram concerning a typing determination function of the portable information device 10.

In one configuration related to typing functions, the CPU 20 includes an operation timing detection unit 40, a typing determination unit 41, and a key input process unit 42.

Based on a signal from the input controller 26, the operation timing detection unit 40 detects when a finger contacts the character key region 12A of the OSK 12. In the following description, the contact of a finger with the character key region 12A of the OSK 12 will be hereinafter referred to as touch start, and the moment in time of this touch start will be hereinafter referred to as a touch start time. Therefore, the operation timing detection unit 40 detects the touch start time. The touch start time is analogous to the moment when a keytop of a physical key of a hardware keyboard is pressed, that is, the timing of a "Make."

The touch start times detected by the operation timing detection unit 40 are stored in the memory 22 in chronological order. The typing determination unit 41 then determines whether contact of a finger on the character key region 12A of the OSK 12 is typing or finger rest.

The typing determination unit 41 does so through a typing determination process. This process determines that contact of a finger with a character key at a touch start time is a character input operation (typing) if another touch start time at an interval less than or equal to a predetermined time from the reference touch start time is not detected.

This predetermined time is also referred to as a minimum typing separation period (MTSP), and is defined to be shorter than the minimum typing interval. The MTSP is, in some embodiments, 20 to 50 msec. Very few, if any users will have typing intervals shorter than this. Touch start times after the reference touch start time may be implemented with a different finger or the same finger with which the reference touch start time is detected.

On the other hand, if another touch start time at an interval of the MTSP or less from the reference touch start time is detected, the typing determination unit 41 determines that placement of a finger on a character key at the reference touch start time is finger rest.

The key input process unit 42 performs a character input process that depends on the character key with which the finger comes into contact at a touch start time when the contact with the finger is determined to be typing by the typing determination unit 41, as opposed to finger rest.

For example, the key input process unit 42 performs an input process of a character corresponding to a character key at a contact position with a finger on the OSK 12. If the finger contact position on the OSK 12 is a function key, the key input process unit 42 performs a process corresponding to the key.

On the other hand, if the typing determination unit 41 determines that contact of a finger on the character key region 12A of the OSK 12 is finger rest, the key input process unit 42 does not perform a character input process.

The typing determination function will now be more specifically described. The operation timing detection unit 40 outputs a touch start detection signal as a detection signal at each touch start. The times when the touch start detection signal is output are stored as touch start times in the memory 22 in chronological order.

The typing determination process calculates a typing interval that is a time interval from a touch start time stored in the memory 22 with reference to a touch start detection signal newly output from the operation timing detection unit 40. The typing determination process compares the calculated typing interval and the MTSP. If the interval of touch start detection signals each output at the corresponding touch start exceeds the MTSP, the touch starts corresponding to these touch start detection signals are determined to be due to typing, as opposed to finger rest or other input.

On the other hand, if the interval of touch start detection signals each output at the corresponding touch start is less than or equal to the MTSP, the typing determination process determines that the touch starts corresponding to these touch start detection signals are due to finger rest. If the interval of touch start detection signals is less than or equal to the MTSP and a new touch start detection signal is not detected after a lapse of the MTSP from the last touch start detection signal, the touch start corresponding to the last touch start detection signal is determined to be due to typing.

Here, in an example of a conventional typing determination process, it is determined whether typing or finger rest is performed at a time when a finger contacting the character key region 12A of the OSK 12 leaves the touch panel 11 for typing (that is, a so-called "Brake" timing), and then a process is performed depending on an input key. In a hardware keyboard, however, since a key input is performed at the "Make" timing when a key is pressed, a user of the OSK 12 struggles with the difference between the key input and an input timing of the hardware keyboard. On the other hand, in this embodiment, the determination process of determining whether typing is performed or not starts with reference to the "Make" timing when a finger is placed on the character key region 12A of the OSK 12. Therefore, the struggles experienced by a user due to a difference between the OSK 12 and the hardware keyboard can be reduced.

Figure 5:
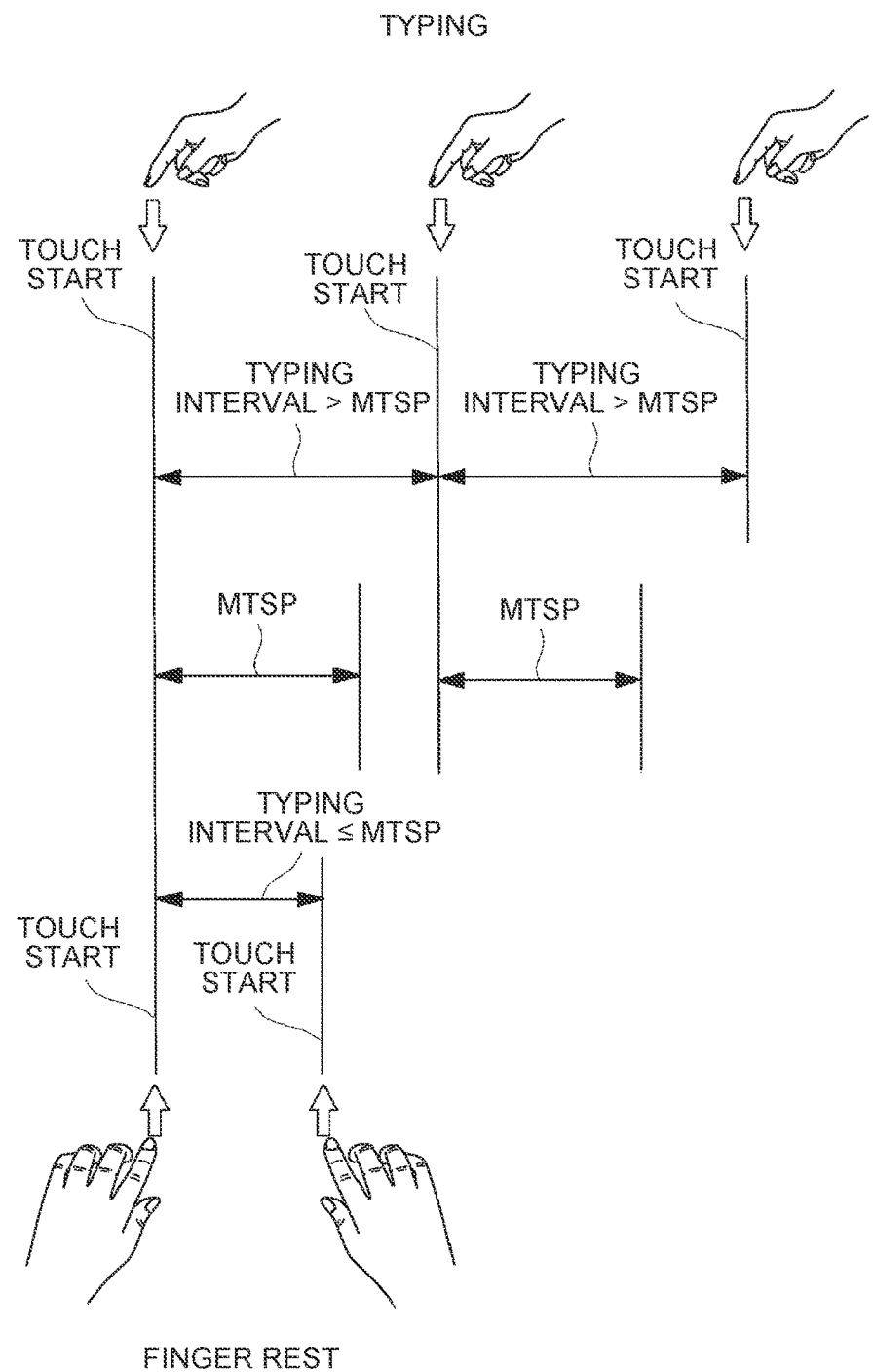
FIG. 5 is a schematic illustration of determination results of typing and finger rest in a typing determination process according to one embodiment of the current subject matter.

FIG. 5 schematically illustrates determination results of typing and finger rest in a typing determination process.

As illustrated in FIG. 5, if the typing interval is less than or equal to the MTSP, the touch start at the reference touch start time is determined to be due to finger rest. This is because the MTSP is shorter than the fastest typing interval used as a reference, and thus, there is no typing with a typing interval of the MTSP or less. In a finger rest state, a plurality of fingers are placed on the OSK 12 substantially at the same time. In such cases, a plurality of touch start times are detected at the substantially the same timing at an interval of the MTSP or less.

On the other hand, if the typing interval exceeds the MTSP, the touch start at the reference touch start time is determined to be due to typing. This is because typing is performed at a time interval exceeding the MTSP.

Figure 6:
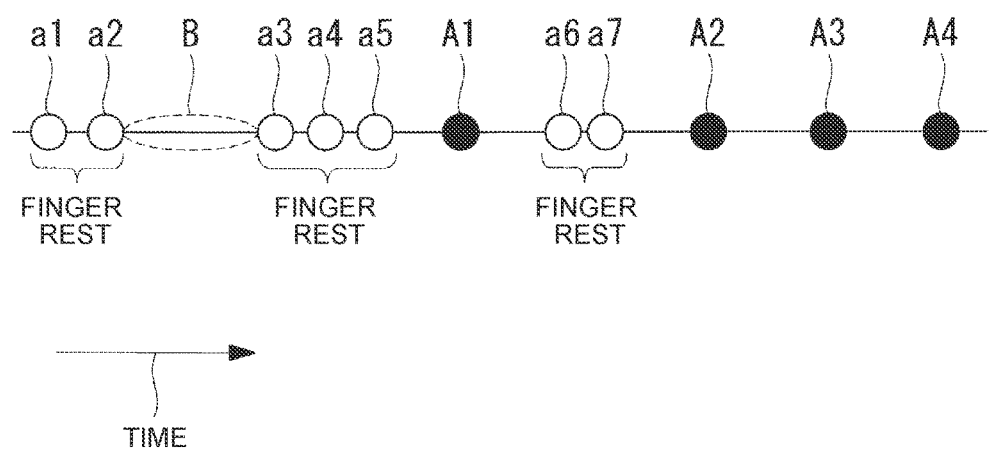
FIG. 6 is a schematic illustration of the time distribution of a touch start detection signal according to one embodiment of the current subject matter.

FIG. 6 schematically illustrates a time distribution of touch start detection signals. Each of the white and black circles in FIG. 6 represent a touch start detection signal output at the timing of touch start. Specifically, white circles (a1 to a7) represent touch start detection signals in the finger rest state, and black circles (A1 to A4) represent touch start detection signals in typing.

In the case of finger rest, a plurality of fingers are placed on the character key region 12A of the OSK 12 at substantially the same time. Thus, a time interval between a touch start detection signal a1 and a touch start detection signal a2, time intervals between touch start detection signals a3 to a5, and a time interval between a touch start detection signal a6 and a touch start detection signal a7 are the MTSP or less.

In a period between the touch start detection signal a2 and the touch start detection signal a3 (i.e., a period represented by "B" in FIG. 6), no new fingers are placed on the character key region 12A of the OSK 12, and thus, no touch start detection signals are output.

On the other hand, regarding touch start detection signals A1 to A4 output in typing, no touch start detection signals are output at an interval of the MTSP or less before and after the output.

Figure 7:
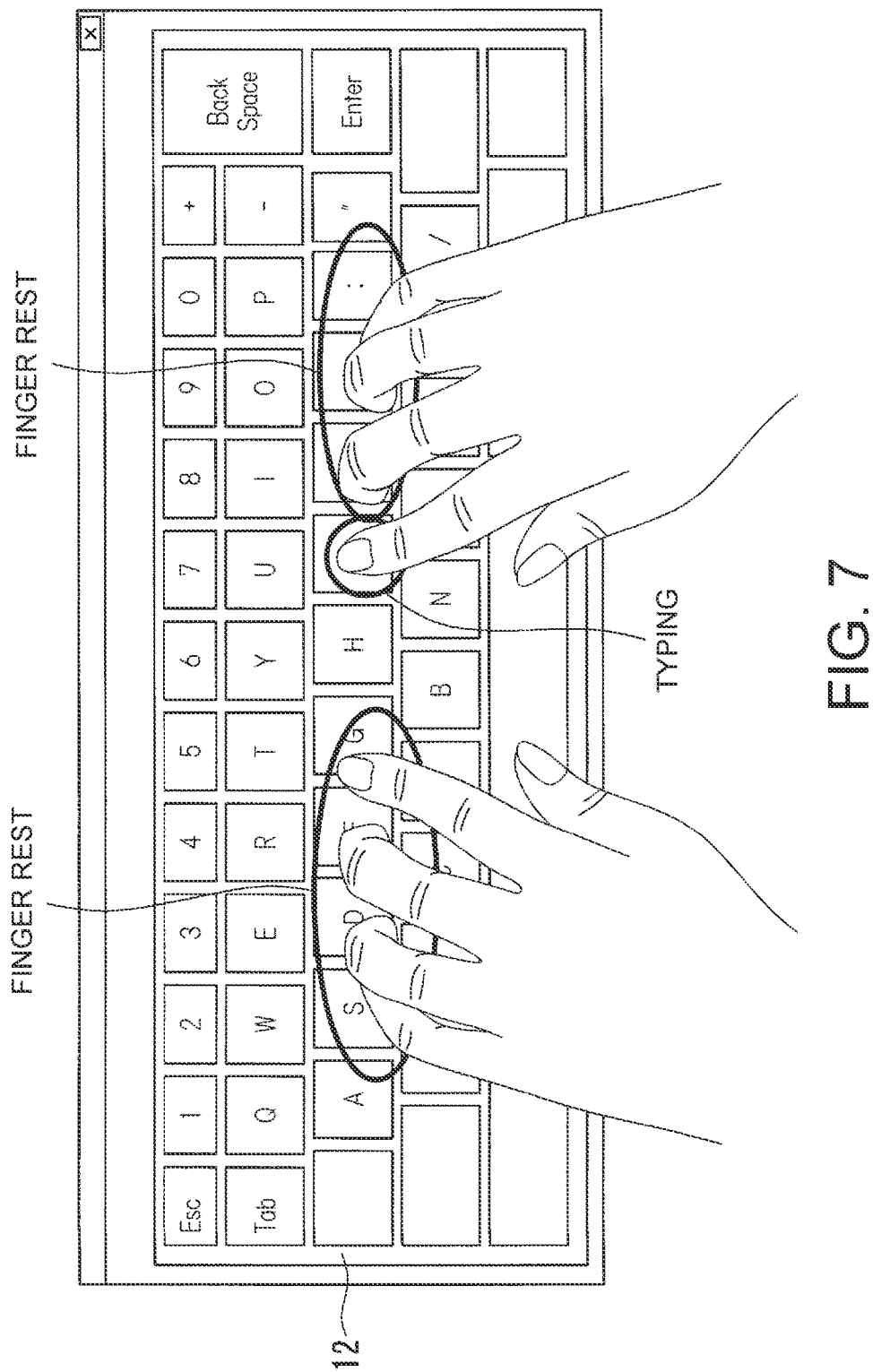
FIG. 7 illustrates a case in which, while a plurality of fingers is in a finger rest state, typing is performed by another finger.

The typing determination process will be more specifically described using the touch start detection signals a3 to a7 and the touch start detection signal A1 as examples. As illustrated in FIG. 7, three fingers (an index finger, a middle finger, and a ring finger) of a left hand are placed on the character key region of the OSK 12 as an operation of finger rest, typing of one character is then performed with a finger (an index finger) of a right hand, and thereafter, two fingers (a middle finger and a ring finger) of the right hand are used in finger rest. When the finger rest operation of placing three fingers on the character key region 12A of the OSK 12 is performed, the touch start detection signals a3 to a5 are sequentially output from the operation timing detection unit 40 in accordance with touch starts of the fingers. Subsequently, when typing of one character is performed on the character key region 12A of the OSK 12, the touch start detection signal A1 is output from the operation timing detection unit 40. Thereafter, when finger rest of two fingers is performed, the touch start detection signals a6 and a7 are sequentially output in accordance with touch starts with the fingers.

First, after the finger rest operation of placing three fingers on the character key region 12A of the OSK 12 is performed, and when a first finger is placed so that the touch start detection signal a3 is output, no touch start detection signals are detected in a period "B" (FIG. 6) before the output of the touch start detection signal a3. In this example, the period "B" (FIG. 6) is longer than the MTSP. Before the lapse of the MTSP from the output of the touch start detection signal a3, however, the second finger is placed so that the touch start detection signal a4 is output. Thus, the typing interval between the touch start detection signal a3 and the touch start detection signal a4 is less than or equal to the MTSP with reference to the touch start detection signal a3, and the touch start detection signal a3 is determined to be due to finger rest.

With reference to the touch start detection signal a4, since the interval between the touch start detection signal a4 and the touch start detection signal a3 is less than or equal to the MTSP, the touch start detection signal a4 is determined to be due to finger rest. The touch start detection signal a5 is also determined to be due to finger rest in a manner similar to the touch start detection signal a4 because the touch start detection signal corresponding to the placement of the third finger is output before a lapse of the MTSP measured from the output of the touch start detection signal a4. The interval between the touch start detection signal A1 and its preceding touch start detection signal a5 is longer than the MTSP with reference to the touch start detection signal A1. In addition, no new touch start detection signals due to touch starts are detected before a lapse of the MTSP measured from the touch start detection signal A1. Thus, the touch start detection signal A1 is determined to be due to typing.

The interval between the touch start detection signal a6 and its preceding touch start detection signal A1 is longer than the MTSP with reference to the touch start detection signal a6. Before a lapse of MTSP measured from output of the touch start detection signal a6, however, the touch start detection signal a7 is output. Thus, the typing interval between the touch start detection signal a6 and the touch start detection signal a7 is less than or equal to the MTSP measure from the touch start detection signal a6, and the touch start detection signal a6 is determined to be due to finger rest. In a manner similar to the touch start detection signal a5, the touch start detection signal a7 is determined to be due to finger rest.

In this manner, the touch start detection signals a3 and a6 are determined to be due to finger rest even though no touch start detection signals are output at an interval less than or equal to the MTSP before output of the touch start detection signals a3 and a6. This is because in the typing determination process, the touch start detection signals a4 and a7 output due to touch starts are detected within the MTSP after the respective reference touch start time. The touch start detection signals a5 and a7 are determined to be due to finger rest although no touch start detection signals are output later at the timing of the MTSP or less. This is because in the typing determination process, the touch start detection signals a4 and a6 due to touch start are detected within the MTSP before the reference touch start time. On the other hand, the touch start detection signal A1 is determined to be due to typing because no touch start detection signals are output at the timing less than or equal to the MTSP neither before nor after the reference touch start time.

In the typing determination process, even if there is a finger contact (for example, touch start detection signals a3 to a5) determined to be due to finger rest, a typing determination process is still performed on a new contact (for example, touch start detection signal A1). If the operation timing detection unit 40 detects another touch start time in a finger rest state, the typing determination unit 41 determines a character input operation with reference to the timing when this another touch start time is detected. If the another touch start time is determined to be due to typing, the key input process unit 42 performs a key input process depending on a character key a finger contacts at the another touch start time on the OSK 12.

As described above, the portable information device 10 according to this embodiment detects a touch start time that corresponds to the moment when a finger contacts the character key region 12A of the OSK 12 displayed on the touch panel 11 and uses the detected touch start time as a reference. If contact of another finger at an interval of the MTSP or less from the reference detected touch start time is not detected before nor after the reference timing, the portable information device 10 determines that placement of the finger on a character key at the reference touch start time is a character input operation. On the other hand, if another touch start time at an interval less than or equal to MTSP measured from the reference timing is detected either before or after the reference timing, the portable information device 10 determines that placement of the finger on the character key at the reference timing is finger rest. Thus, the portable information device 10 according to this embodiment can more accurately determine whether a finger on the OSK 12 is for key input or not.

In this embodiment, it cannot be determined whether a touch start time is due to typing or finger rest unless a time greater than the MTSP has elapsed from the touch start time. Thus, the key input process unit 42 performs a key input process after a lapse of at least the MTSP from a touch start time of typing. The MTSP, however, is sufficiently shorter than a time interval that can be recognized by a human. Thus, even when a key input process is performed after a lapse of the MTSP from the typing, a user feels that the key input process is performed at the "Make" timing when a finger is placed on the character key region 12A of the OSK 12.

A second embodiment will now be described.

A configuration of a portable information device 10 according to the second embodiment is similar to that of the portable information device 10 according to the first embodiment illustrated in FIGS. 1 and 2, and thus, description thereof will not be repeated.

As described above, the portable information device 10 according to the first embodiment can accurately determine finger rest that is a typing stop state.

The portable information device 10 according to the second embodiment has the function (hereinafter referred to as a "rest pad function") of executing, as an operation command other than character input, a change of the position of a finger (gesture operation) on a character key region 12A of an OSK 12 in a state where placement of the finger is determined to be finger rest.

The operation command other than character input is a gesture operation command, and is, for example, an operation command for an object or image displayed on a touch panel 11. For example, the object may be an image such as a pointer 14, the OSK 12, a still image, or a moving image.

The rest pad function is the function of performing a process similar to a process of using a touch pad or a mouse by changing a contact state of a finger on a region where character keys of the OSK 12 are displayed in a finger rest state using the character key region 12A of the OSK 12 in a manner similar to that of a pointing device such as a touch pad.

Thus, the portable information device 10 according to the second embodiment can smoothly shift between the character input operation and the rest pad function. In addition, since it is possible to perform an operation similar to an operation using a mouse on a display region shared by character input region, maintenance of and return to a home position with respect to the OSK 12 can be easily performed. Thus, convenience of an operation by a user can be enhanced, and in addition, a limited display region can be effectively utilized.

Figure 8:
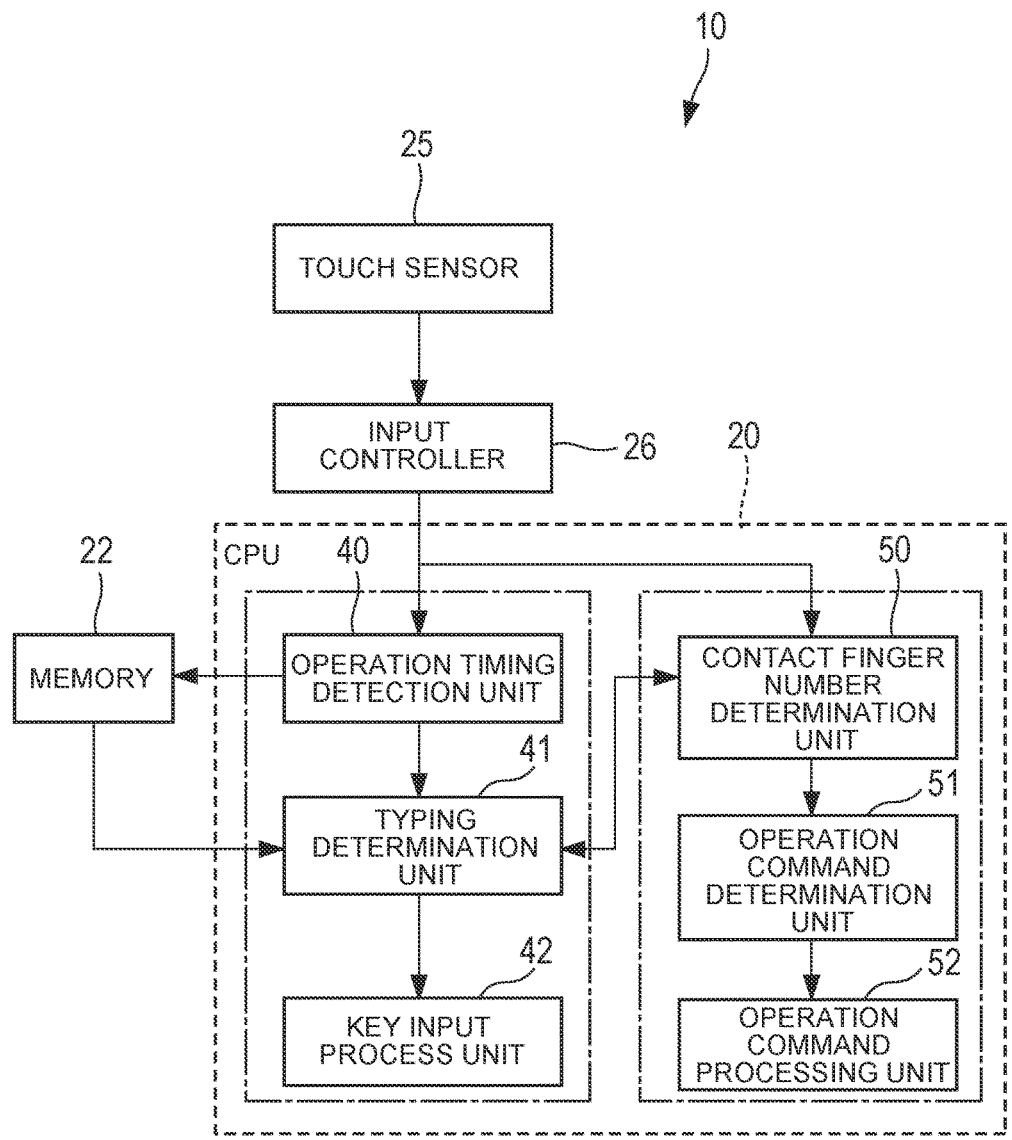
FIG. 8 is a functional block diagram related to a rest pad function according to one embodiment of the current subject matter.

FIG. 8 is a functional block diagram related to a rest pad function of the portable information device 10. Components of the configuration illustrated in FIG. 8 already described in FIG. 4 are denoted by the same reference numerals, and description thereof will not be repeated.

The CPU 20 includes a contact finger number determination unit 50, an operation command determination unit 51, and an operation command processing unit 52, all of which form a configuration related to the rest pad function.

If the typing determination unit 41 determines that contact of fingers on the character key region 12A is determined to be due to finger rest, the contact finger number determination unit 50 determines the number of fingers contacting the character key region 12A based on a signal from an input controller 26.

In the finger rest state, the operation command determination unit 51 determines a gesture operation command depending on a change of the position of a finger (or fingers as the case may be) on the character key region 12A. The operation command determination unit 51 determines a gesture operation command depending on changes of positions of fingers at a plurality of locations on the character key region 12A.

The change of positions of fingers comprises a change of the contact state of fingers on the touch panel 11, and specifically includes movement of fingers on the touch panel 11 or a change of the number of fingers contacting the touch panel 11, for example. In one example, placement of a plurality of fingers on the OSK 12 is determined to be due to finger rest. The number of fingers on the OSK 12 in the finger rest state may decrease until only one finger is located on the OSK 12. In this manner, the operation command determination unit 51 determines a gesture operation command in accordance with a change of the contact state of one or more fingers on the character key region 12A.

The operation command determination unit 51 also determines a gesture operation command in accordance with consecutive changes of positions of fingers between the character key region 12A and a region except the character key region 12A.

In accordance with the rest pad function according to this embodiment, a gesture operation command may be determined in accordance with a change of positions of fingers not only on the character key region 12A but also on the entire image of the OSK 12. However, the embodiments are not limited to this example. The region or regions other than the character key region 12A need not comprise the entire area of the OSK 12 and may be a region that includes the character key region 12A but is smaller than the entire image of the OSK 12.

In the finger rest state, the operation command determination unit 51 determines a gesture operation command in accordance with a combination of a change of positions of fingers on the character key region 12A and a change of positions of fingers on the region except the character key region 12A. The combination is, for example, a change of a contact state of a finger in a state where a finger of the left hand is in contact with the character key region 12A and a finger of the right hand is in contact with a region other than the character key region 12A, such as the function key. In the following description, the combination will be hereinafter referred to as a combination gesture.

The operation command processing unit 52 executes a process in accordance with a gesture operation command determined by the operation command determination unit 51.

Though the process for determining finger rest in the typing determination unit 41 using the MTSP as described in the first embodiment may be used in this embodiment, other processes for determining finger rest may be used. For example, the typing determination unit 41 may determine that the contact state is due to finger rest based on a condition that a finger contacts the character key region 12A of the OSK 12 in a predetermined mode.

For example, in a case where the touch panel 11 is a pressure-sensitive touch panel, the predetermined mode may be a mode in which a contact pressure of a finger on the character key region 12A continues at a predetermined level or less and continues for a predetermined period or longer. In a case where the touch panel 11 is not of a pressure-sensitive type, the predetermined mode may be another mode in which the contact state of a finger on the character key region 12A continues for a predetermined time or longer.

The embodiments are not limited to these examples. For example, the typing determination unit 41 may determine that the contact state is due to finger rest, based on a condition that a plurality of fingers contact the character key region 12A at a plurality of locations at the same time in a predetermined mode.

In addition, in embodiments wherein placement of fingers is determined to be due to finger rest based on a condition that a plurality of fingers is placed on the OSK 12, the typing determination unit 41 may determine that the state of finger rest is maintained in a state even if the number of fingers on the fingers OSK 12 decreases, so long as at least one of the fingers remains on the OSK 12. The typing determination unit 41 may also determine that the state of finger rest is maintained even in a case where a new finger is placed on the OSK 12 in the finger rest state.

Figure 9:
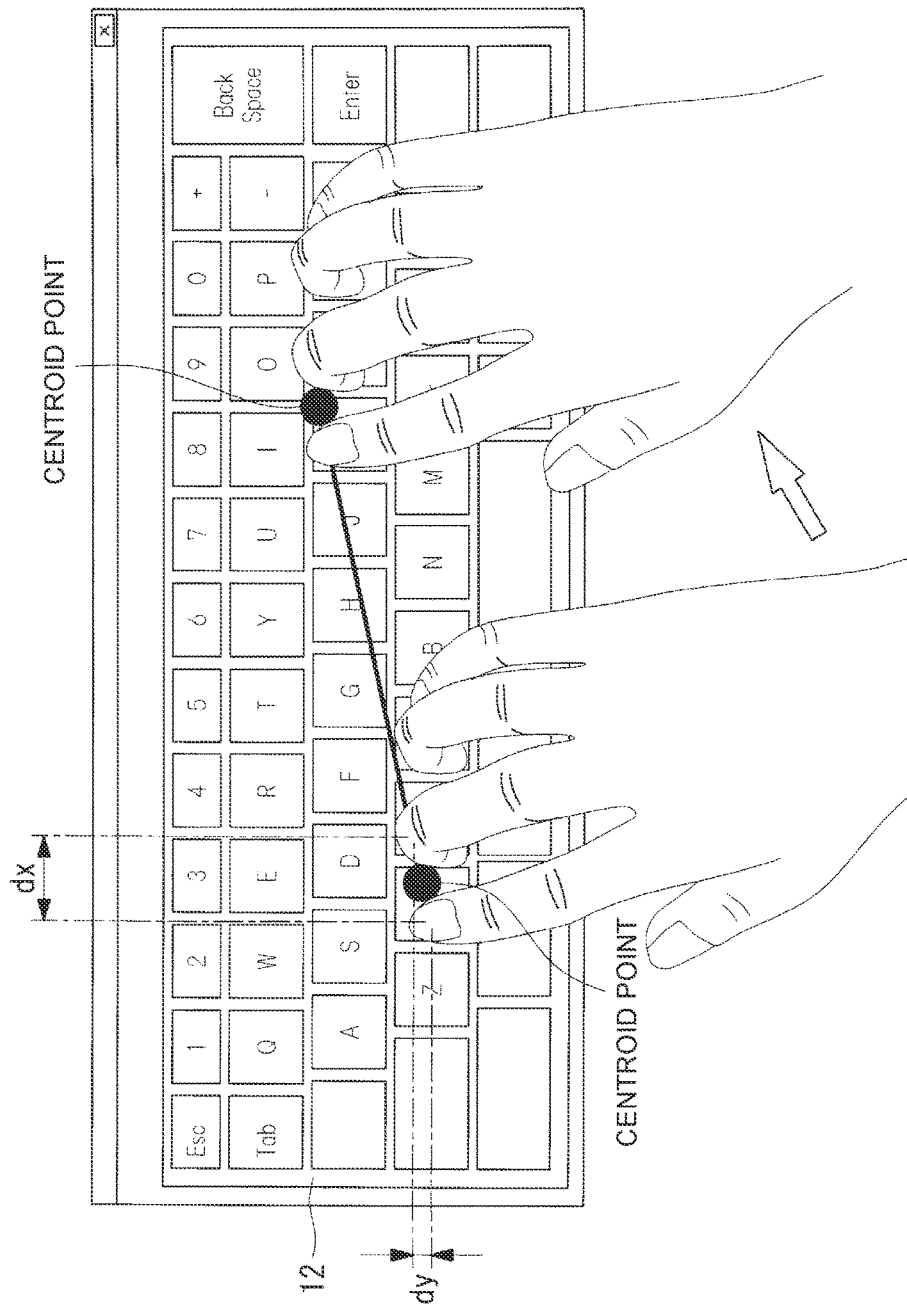
FIG. 9 is an illustration of a contact position between an OSK and a finger in a case where a pointer function is used, according to one embodiment of the current subject matter.
Figure 10:
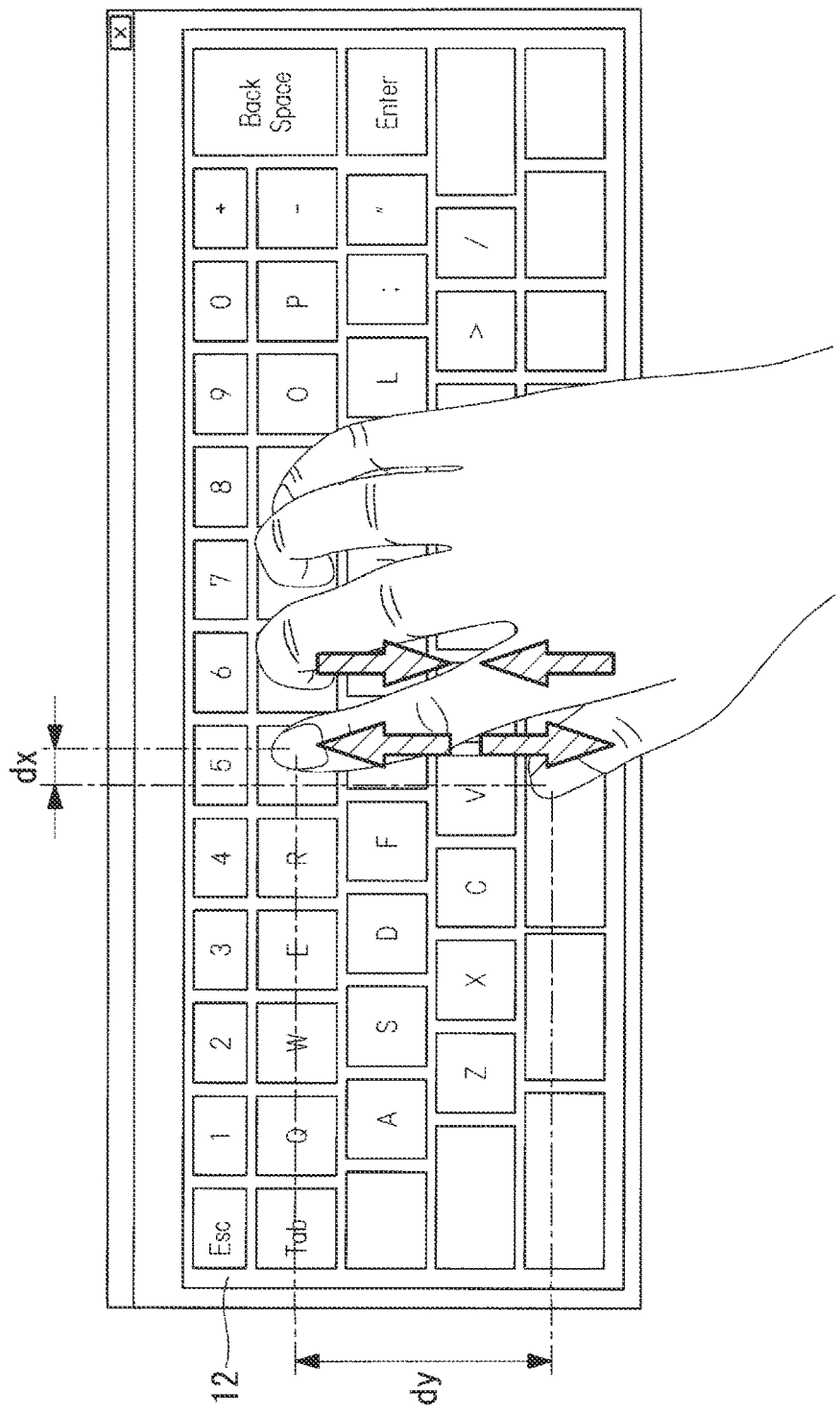
FIG. 10 is an illustration of a contact position between the OSK and a finger in a case where a pinch function is used, according to one embodiment.

Referring now to FIGS. 9 and 10, a specific example of the rest pad function will be described.

If the rest pad function is used, the touch panel 11 displays the pointer 14, irrespective of whether a mouse is connected to the USB port 13 or not. In different embodiments, the rest pad function may include a pointer function, a pinch function, a virtual click function, or a drag function, which will be described later.

If the contact finger number determination unit 50 determines that a plurality of fingers is placed on the OSK 12, the operation command determination unit 51 determines the arrangement of contact positions of the fingers on the OSK 12.

In a case where two fingers contact the OSK 12 as illustrated in FIGS. 9 and 10, the orientation of arrangement of contact positions is determined by comparing a lateral distance dx and a vertical distance dy between the contact positions on the OSK 12. Specifically, if the lateral distance is larger than the vertical distance (dx>dy) as illustrated in FIG. 9, the fingertips are determined to be laterally arranged. On the other hand, if the lateral distance is smaller than the vertical distance (dx<dy) as illustrated in FIG. 10, the fingertips are determined to be vertically arranged.

When the fingertips are laterally arranged, the pointer function is implemented. The pointer function comprises moving the position of the pointer 14 that is an operation target in accordance with movement of positions of fingers. The operation target is not limited to the pointer 14, and may be another object that has been previously set.

If the fingertips are determined to be laterally arranged, the operation command determination unit 51 obtains a centroid point of contact positions of a plurality of fingers on the OSK 12. For example, in a case where two fingers of an index finger and a middle finger contact the OSK 12 as illustrated in FIG. 9, for example, the centroid point comprises a center point of a line connecting the two contact positions.

In a case where two fingers move on the OSK 12 as illustrated in FIG. 9, (that is, the centroid point slides on the OSK 12), the operation command determination unit 51 determines that a change in contact states of the fingers on the OSK 12 comprises an operation command for moving the pointer 14.

Then, the operation command processing unit 52 moves the pointer 14 displayed on the touch panel 11 in accordance with the movement of the centroid point.

The pinch function is not active while the pointer function is active.

As described above, to move the pointer 14, a user can arrange the fingertips of the index finger and the middle finger laterally to use the pointer function and move the fingers laterally or vertically while keeping the fingertips in contact with the touch panel 11 and maintaining the distance between the fingertips.

In this embodiment, the pointer 14 is moved in accordance with movement of the centroid point. However, the embodiments are not limited to this example, and the pointer 14 may be moved without obtaining the centroid point. For example, the pointer 14 may be moved in accordance with movement of the position of one of a plurality of fingers laterally arranged (for example, the position of the rightmost finger).

In addition, in a case where placement of a plurality of fingers on the OSK 12 is determined to be finger rest and then the number of fingers on the OSK 12 decreases to one in the finger rest state, the pointer 14 may be moved in accordance with movement of the last one finger.

When the fingertips are arranged vertically, the pinch function is active.

The pinch function is the function of enlarging or diminishing an image displayed on the touch panel 11. For example, the pinch function of this embodiment enlarges or diminishes an image of the OSK 12, for example.

The operation command determination unit 51 determines a change of the distance between contact positions of a plurality of fingers determined to be in the vertical arrangement. If the distance of contact positions of the fingers changes, this change is determined to be an operation command for enlarging or diminishing the OSK 12.

One example includes a case where two fingers of an index finger and a thumb contact the OSK 12 and the vertical distance dy between contact positions of the two fingers increases as illustrated in FIG. 10, this increase is determined to be an enlargement command (zoom out) for the OSK 12. On the other hand, in a case where the vertical distance dy decreases, this decrease is determined to be a diminishing command (zoom in) for the OSK 12. However, the embodiments are not limited to this configuration.

The operation command processing unit 52 enlarges or diminishes the OSK 12 displayed on the touch panel 11 in accordance with the change of the vertical distance dy.

If the pinch function is used, the pointer function is not active.

As described above, in the case of enlarging or diminishing an image using the pinch function, a user arranges the fingertips of an index finger and a thumb vertically so that the vertical distance between the fingertips is changed.

In the above description, the OSK 12 is enlarged or diminished. However, the embodiments are not limited to this example, and another image displayed on the touch panel 11 may be selected by the pointer 14 so that the selected image is enlarged or diminished.

In the example described above, the pointer function is active when the fingertips are arranged laterally, whereas the pinch function is active when fingertips are arranged vertically. Alternatively, the pointer function may be active when fingertips are arranged vertically with the pinch function being active when the fingertips are arranged laterally.

In the case where the pointer function is active when fingertips are arranged vertically, the pointer moves in accordance with movement of a centroid point of the vertically arranged fingertips. In the case where the pinch function is active when the fingertips are arranged laterally, an image is enlarged or diminished in accordance with a change of the distance between the laterally arranged fingertips.

The virtual click function will now be described. The virtual click function is analogous to the click of a physical mouse.

If a plurality of fingers is separated from the OSK 12 of the touch panel 11, the operation command determination unit 51 determines an operation command depending on the number of consecutive such separations. In some embodiments, this separation comprises tapping on the touch panel 11 with a plurality of fingers.

The number of consecutive separations means one or more repetitive contacts and separations of a plurality of fingers. For example, it may mean one or more taps on the touch panel 11 within a predetermined time such as one second. The case of one separation includes not only one tap but also a case where a plurality of fingers is separated substantially simultaneously from a finger rest state (i.e., a state where a plurality of fingers is placed on the OSK 12 for a couple of seconds or more, which includes the "Break" case).

In one example, the plurality of fingers includes an index finger and a middle finger or two fingers of an index finger and a thumb. However, the embodiments are not limited to this example, and other combinations of fingers, including three or more fingers may be used.

As an example, in a case where a plurality of fingers contacting the OSK 12 are separated once at the same time from the OSK 12, the operation command determination unit 51 determines that this separation is an operation command identical to a single-click of a mouse. In a case where a plurality of fingers contacting the OSK 12 are consecutively separated twice from the OSK 12 (in the case of a double tap), these separations are determined to be an operation command identical to a double-click of a mouse.

Thereafter, the operation command processing unit 52 performs a process in accordance with the number of consecutive simultaneous separations of a plurality of fingers.

In a case where a plurality of fingers is consecutively and substantially simultaneously separated from the OSK 12 three or more times, such as a triple-touch, the content of a process may be set beforehand in accordance with the number of consecutive separations. Different processes may be implemented based on the number of consecutive touches.

The drag function will now be described.

In a case where a new finger is placed on the function key in a state where a pointing operation is performed so that the pointer 14 overlaps a frame of a window or an icon of a file displayed on the touch panel 11, for example, the operation command determination unit 51 determines that this placement of the new finger is an operation command for making the drag function active. In this manner, the drag function is active in a case where the combination gesture is performed.

A dragged icon or other object may then be moved according to the movement of the position of a finger that performs a pointing operation, and when the finger on the function key is separated from the OSK 12, the dragged icon or other objects are dropped.

The rest pad function, in some embodiments, includes a function different from the pointer function, the pinch function, the virtual click function, and the drag function. For example, the rest pad function may include a swipe function, a flick function, and a rotation function that rotates an image displayed on the touch panel 11 based upon the rotation of the contact position of one finger on the OSK 12 around the contact position of another finger.

In addition, an image displayed on the touch panel 11 may change so as to enable a user to recognize that the rest pad function is active. For example, while the rest pad function is active, the character key region 12A or an image of the OSK 12 displayed on the touch panel 11 may be thinner than that while the rest pad function is inactive, or an image of the character key region 12A may be erased from the OSK 12.

While the rest pad function is active, an image indicating that the rest pad function is active may be displayed.

As described above, the portable information device 10 of this embodiment determines an operation command other than character input in accordance with the position of a finger or fingers on the character key region 12A in a finger rest state, and performs a process in accordance with the determined operation command. Thus, the portable information device 10 of this embodiment can perform an operation similar to an operation using a mouse or a touch pad while performing an input operation of, for example, characters with the OSK 12 and maintaining a home position. Thus, convenience for a user can be enhanced.

The technical scope of the disclosure, however, is not limited to the range described in the above embodiments. Various changes and modifications may be made on the embodiments, and embodiments obtained by such changes and modifications are included in the technical scope of the disclosure. The embodiments may be suitably combined.

Figure 11:
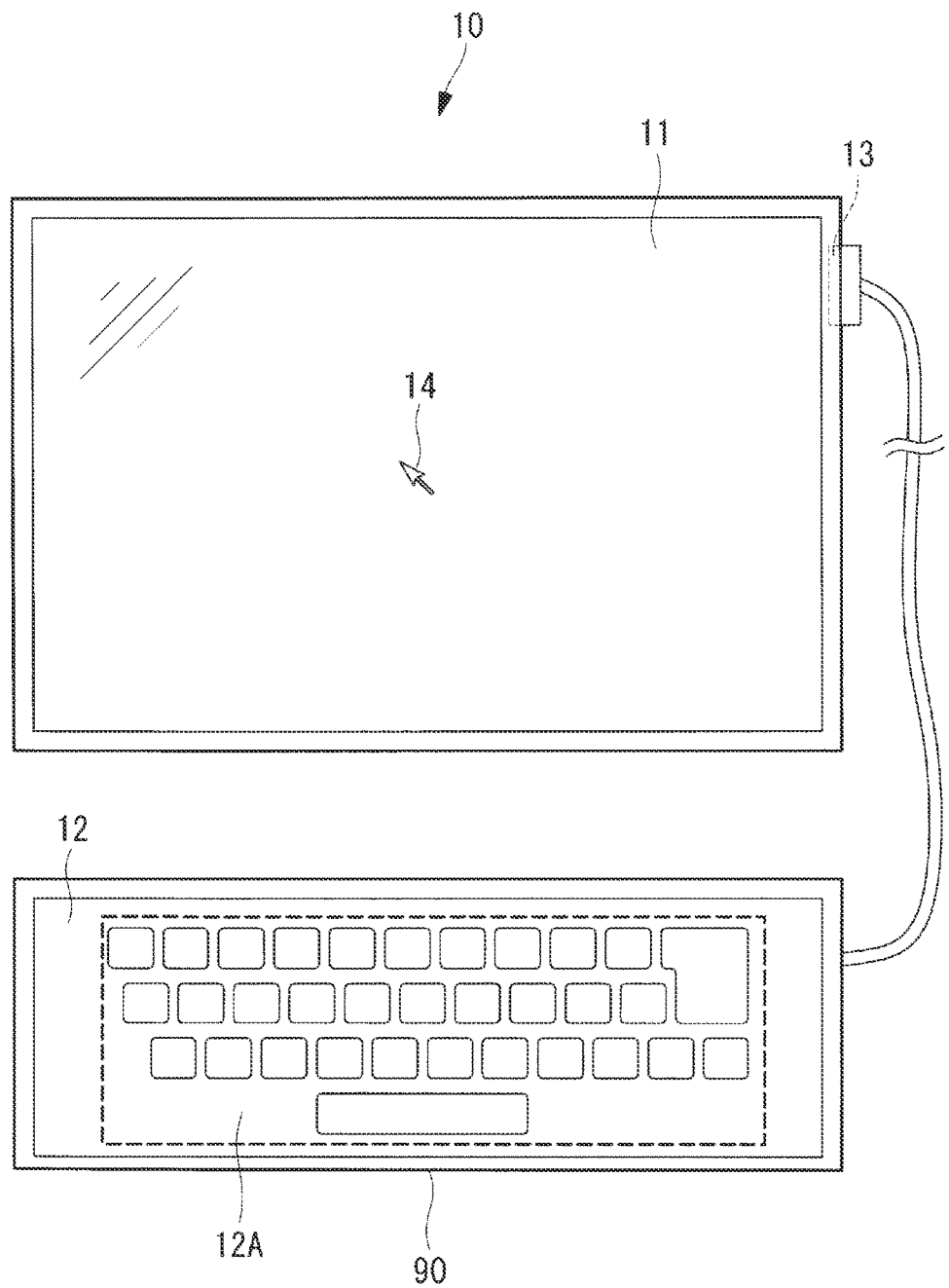
FIG. 11 is a schematic illustration of one embodiment of a portable information device.

For example, in the above embodiments, the software keyboard the OSK 12 displayed on the touch panel 11 of the portable information device 10. However, the embodiments are not limited to this example, and, as illustrated in FIG. 11, the software keyboard may be a flat keyboard 90 that is a flat-plane keyboard externally connected to the portable information device 10 through the USB port 13. The flat keyboard 90 comprises, in some embodiments, a touch panel, and can display a software keyboard.

The software keyboard is not limited to the above example, nor to the examples described throughout, and may be a keyboard projected on an object such as a table, a paper medium, a human body or space. In such cases, the position of an operation medium in, for example, a character key region 12A of the projected keyboard is detected.

Embodiments may be practiced in other specific forms. The described embodiments are to be considered in all respects only as illustrative and not restrictive. The scope of the embodiments is, therefore, indicated by the appended claims rather than by the foregoing description. All changes which come within the meaning and range of equivalency of the claims are to be embraced within their scope.

What is claimed is:

1. An information processing device, comprising:
   an operation timing detection unit that detects when an operation medium is placed on a character key region of a software keyboard;
   a typing determination unit that:
      determines that a plurality of inputs by the operation medium on a set of character keys is a character input operation in response to the plurality of inputs being performed at an interval of time beginning with a first input of the plurality of inputs and ending with a second input of the plurality of inputs that is greater than a predetermined amount of time, wherein the predetermined amount of time defines a minimum typing separation period (MTSP), and
      determines that the plurality of inputs on the set of character keys is a non-input operation state in response to the interval of time being less than the predetermined amount of time defining the MTSP; and
   a key input process unit that performs a character input process in response to determining that the plurality of inputs include the character input operations,
   wherein at least a portion of said units comprises one or more of a set of hardware circuits, a set of programmable hardware devices, and executable code stored on a set of non-transitory computer-readable storage media.

2. The information processing device of claim 1, wherein:
   the key input process unit declines to perform the character input process in response to determining that the plurality of inputs include the non-input operation state.

3. The information processing device of claim 2, wherein:
   in response to the operation timing detection unit detecting a third input after the non-input operation state, the typing determination unit determines that the third input is the character input operation, and
   the key input process unit performs the character input process for a character key on which the operation medium is placed for the third input.

4. The information processing device according to claim 2, further comprising:
   an operation command determination unit that determines an operation command other than a character input in accordance with a change of a position of the operation medium on the character key region in the non-input operation state; and
   an operation command processing unit that performs a command process in accordance with the operation command other than the character input determined by the key input process unit.

5. The information processing device of claim 4, wherein the operation command determination unit determines the operation command other than the character input in a state in which the operation medium is placed at a location other than the character key region.

6. The information processing device of claim 4, wherein the operation command determination unit determines the operation command other than the character input based on a combination of a change of the position of the operation medium on the character key region and a change of the position of the operation medium on a region other than the character key region.

7. The information processing device of claim 4, wherein the operation command determination unit determines the operation command other than the character input in accordance with a consecutive change of the position of the operation medium between the character key region and a region other than the character key region.

8. The information processing device of claim 1, further comprising:
   an operation command determination unit that determines an operation command other than a character input in accordance with a change of a position of the operation medium on the character key region in the non-input operation state; and
   an operation command processing unit that performs a process in accordance with the operation command except the character input determined by the key input process unit,
   wherein the typing determination unit further determines that placement of the operation medium on the character key region of the software keyboard is carried out in the non-input operation state in which the plurality of inputs are not received as the character input operation in response to the operation medium operating in a predetermined operating mode on the character key region.

9. The information processing device of claim 8, wherein, in response to the operation medium operating in a predetermined mode and being placed at a plurality of locations on the character key region to generate the plurality of inputs, the typing determination unit determines that the plurality of inputs comprise the non-input operation state.

10. The information processing device of claim 9, wherein the operation command determination unit determines the operation command other than the character input in accordance with a change of the position of the operation medium in a state in which the operation medium is placed at the plurality of locations on the character key region.

11. The information processing device of claim 9, wherein, in response to a change in a distance between the plurality of locations of the operation medium, the operation command determination unit determines that the operation command other than the character input is an operation command for one of enlarging and diminishing a displayed image.

12. The information processing device of claim 11, wherein the displayed image is an image of the software keyboard.

13. The information processing device of claim 9, wherein, in response to the plurality of locations of the operation medium being separated from the character key region, the operation command determination unit determines an operation command in accordance with a quantity of consecutive separations of the plurality of inputs of the operation medium.

14. The information processing device of claim 8, wherein the operation command determination unit determines the operation command other than the character input in accordance with a change of the position of the operation medium on the character key region and a change of the position of the operation medium on a region other than the character key region.

15. The information processing device of claim 8, wherein the operation command determination unit determines the operation command other than the character input in accordance with a consecutive change of the position of the operation medium between the character key region and a region other than the character key region.

16. The information processing device claim 8, wherein, in response to moving the position of the operation medium, the operation command determination unit determines that the operation command other than the character input is an operation command for moving a position of an operation target in accordance with a movement of the position of the operation medium.

17. An input determination method comprising:
   detecting, by a processor, when an operation medium is placed on a character key region of a software keyboard of an information processing device;
   determining that a plurality of inputs by the operation medium on a set of character keys of the character key region is a character input operation in response to the plurality of inputs being performed at an interval of time beginning with a first input of the plurality of inputs and ending with a second input of the plurality of inputs that is greater than a predetermined amount of time, wherein the predetermined amount of time defines a minimum typing separation period (MTSP);
   determines that the plurality of inputs on the set of character keys is a non-input operation state in response to the interval of time being less than the predetermined amount of time defining the MTSP; and
   performing a character input process in response to determining that the plurality of inputs include the character input operations.

18. The method of claim 17, further comprising:
   determining that, in response to the operation medium being placed in a predetermined mode on the character key region, placement of the operation medium on the character key region includes the non-input operation state in which the placement comprises an input other than the character input operation;
   determining an operation command other than a character input in accordance with a change of a position of the operation medium on the character key region includes the non-input operation state; and
   performing a process other than the character input in accordance with the operation command other than the character input.

19. A computer program product comprising a non-transitory computer-readable storage medium that stores code executable by a processor, the executable code comprising code causing the processor to perform:
   detecting when an operation medium is placed on a character key region for providing a plurality of inputs to a software keyboard;
   determining that a placement of the operation medium on a set of character keys of the character key region is a character input operation in response to the plurality of inputs being performed at an interval of time beginning with a first input of the plurality of inputs and ending with a second input of the plurality of inputs that is greater than a predetermined amount of time, wherein the predetermined amount me defines a minimum typing separation period (MTSP);
   determining that the plurality of inputs on the set of character keys is a non-input operation state in response to the interval of time being less than the predetermined amount of time defining the MTSP; and
   performing a character input process in response to determining that the plurality of inputs include the character input operations.

20. The computer program product of claim 19, further comprising code causing the processor to perform:
   determining that, in response to the operation medium being placed in a predetermined mode on the character key region, placement of the operation medium on the character key region includes the non-input operation state in which the placement comprises an input other than the character input operation;
   determining that an operation command other than a character input in accordance with a change of a position of the operation medium on the character key region includes the non-input operation state; and
   performing a process other than the character input in accordance with the operation command other than the character input.

* * * * *